United States Patent
Fenzl et al.

(10) Patent No.: US 7,306,088 B2
(45) Date of Patent: Dec. 11, 2007

(54) ASSEMBLY PLANT FOR ASSEMBLING INDUSTRIAL PRODUCTS

(75) Inventors: Werner Fenzl, Munich (DE); Gerd Schlage, Munich (DE); Jan Knau, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/929,767

(22) Filed: Aug. 31, 2004

(65) Prior Publication Data

US 2005/0087426 A1  Apr. 28, 2005

Related U.S. Application Data

(63) Continuation of application No. PCT/EP03/01401, filed on Feb. 13, 2003.

(30) Foreign Application Priority Data

Mar. 1, 2002  (DE) .................. 102 08 850

(51) Int. Cl.
*B65G 47/84* (2006.01)
(52) U.S. Cl. .............. 198/465.2; 198/346.2; 198/580
(58) Field of Classification Search ............ 198/347.1, 198/358, 349, 349.6, 370.01, 346.1, 346.2, 198/465.2, 580; 29/33 P
See application file for complete search history.

(56) References Cited

U.S. PATENT DOCUMENTS

| | | | | |
|---|---|---|---|---|
| 1,408,047 A | * | 2/1922 | Upp | 29/791 |
| 2,353,638 A | * | 7/1944 | Beaulieu et al. | 198/346 |
| 3,246,733 A | * | 4/1966 | Torbet et al. | 198/370.07 |
| 3,889,797 A | | 6/1975 | Naito | |
| 5,174,707 A | * | 12/1992 | Suekane et al. | 414/269 |
| 5,374,231 A | * | 12/1994 | Obrist | 29/33 P |
| 5,537,741 A | * | 7/1996 | Peterson et al. | 29/868 |
| 5,740,602 A | * | 4/1998 | Peterson et al. | 29/748 |
| 6,070,320 A | * | 6/2000 | Tomforde et al. | 29/771 |
| 6,769,536 B2 | * | 8/2004 | Lutz | 198/861.1 |
| 6,840,367 B2 | * | 1/2005 | Tucker | 198/346 |

FOREIGN PATENT DOCUMENTS

EP  0 738 652 A1  3/1996

OTHER PUBLICATIONS

International Search Report, Apr. 17, 2003.
Hallwag S.A. Berne - "Revius Automobile" vol. 84, No. 27, Jun. 29, 1989.

* cited by examiner

*Primary Examiner*—James R. Bidwell
(74) *Attorney, Agent, or Firm*—Crowell & Moring LLP

(57) ABSTRACT

An assembly plant, in particular for assembling motor vehicles, which permits design of final assembly of motor vehicles so that it is as flexible as possible in terms of space. A central elongated assembly hall is provided in which essentially automated assembly regions are provided and finger-like partial regions having essentially manual workplaces are provided projecting at a right angle from the longitudinal side. A change in the sequence in the manual regions can be accomplished easily by an extension of the finger-like partial regions at the head end.

7 Claims, 2 Drawing Sheets

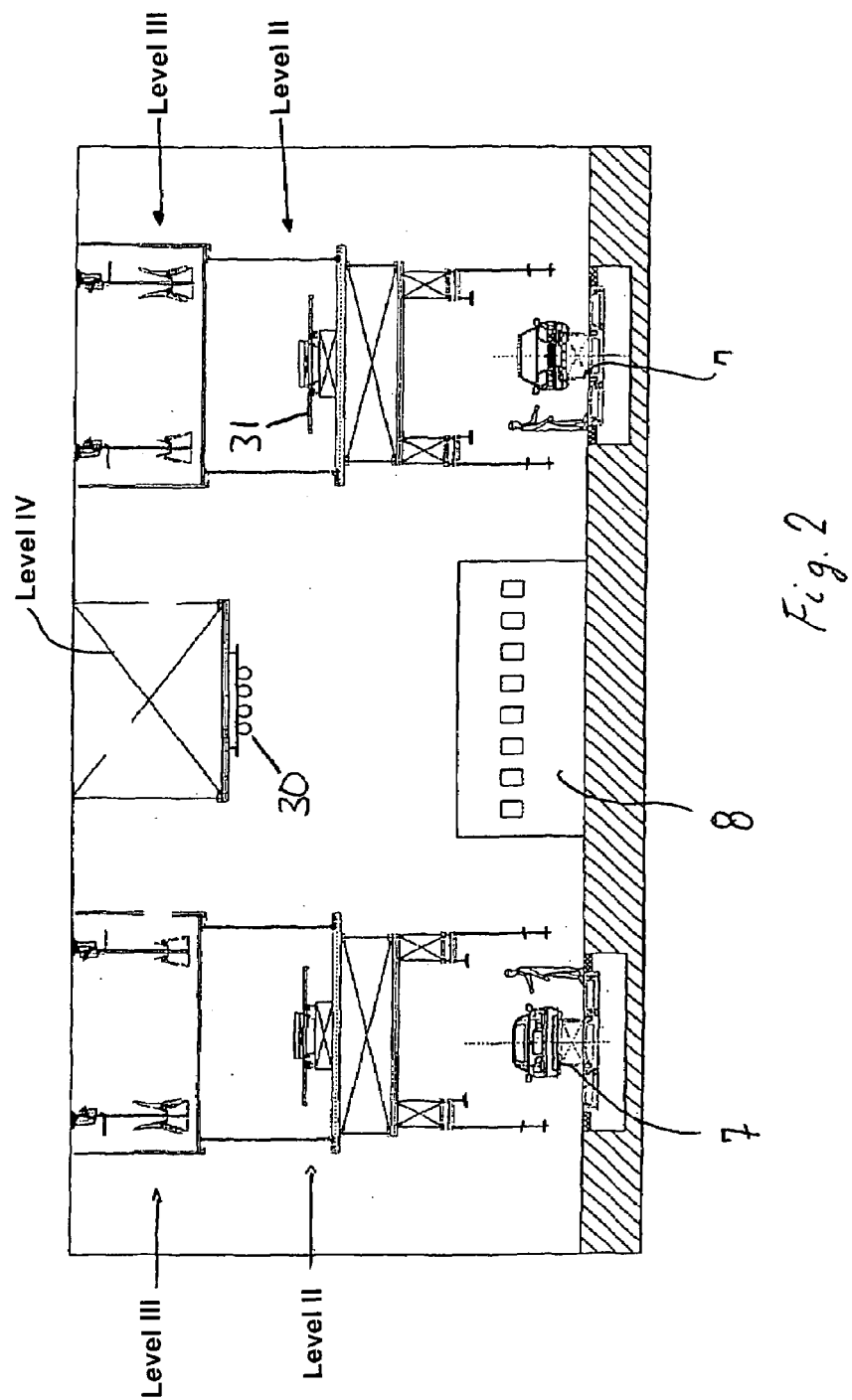

ASSEMBLY PLANT FOR ASSEMBLING INDUSTRIAL PRODUCTS

This application claims the priority of German application no. 10208850.0, filed Mar. 1, 2002, and PCT International Patent Application No. PCT/EP03/01401, filed Feb. 13, 2003, the disclosure of which is expressly incorporated by reference herein.

BACKGROUND AND SUMMARY OF THE INVENTION

This invention relates to an assembly plant for assembling industrial products, and in particular vehicles.

A generic assembly plant is known from European Patent EP 0 738 652 B1. It has a central area with hall areas branching off from it radially or in a cross-shaped configuration with U-shaped conveyor loops in each hall area. Other separate assembly plants are provided in the intermediate spaces, where modules can be preassembled. Short conveyance pathways for the preassembled modules can be achieved with this arrangement.

One disadvantage of this basic concept of final assembly for vehicles is its restricted flexibility with respect to changes in assembly sequences and integration of different automotive concepts.

The object of the present invention is to remedy this situation.

This object is achieved by a central elongated assembly hall provided with finger-like hall extensions branching off from it on a longitudinal side. The conveyor devices run on the longitudinal sides of the central assembly hall and on the outer sides of the hall extensions so that a U-shaped path is obtained on the whole. Thus at least one transverse side of the hall is free and is available for design changes, lengthening the hall and thus also the conveyor path without making far-reaching changes in the overall sequence.

This arrangement is especially advantageous in combination with the refinement of essentially automated assembly sites in the central assembly hall, and manual assembly sites in the finger-like partial regions. As a rule, automated assembly sites always require the same amount of space regardless of the type of vehicle to be produced. They are therefore arranged in the central assembly hall and in addition to determining the space required for incoming deliveries (e.g., via trucks), they also determine the grid spacing for the finger-like hall extensions. A change in the manual work places accommodated in the finger-like hall extensions is possible with no problem in the event of a production change through a simple extension of the design at the head end or through changes in the availability of materials and optionally the displacement of handling equipment. This permits a separation of labor-intensive manual work from automated complex processes.

Especially short paths for the workers are achieved by arranging the work rooms and/or social rooms between the legs of the U-shaped conveyor devices. These are provided along a central axis.

The refinement of the invention, in which supply lines for nearby assembly lines are arranged above the work rooms and/or social rooms, simplifies the structural complexity, also with respect to a simple expansion of the assembly halls.

Additional embodiments below and in the claims describe simple designs for the conveyor systems and the transport of materials to the assembly sites.

Other objects, advantages and novel features of the present invention will become apparent from the following detailed description of the invention when considered in conjunction with the accompanying drawings.

BRIEF DESCRIPTION OF THE DRAWINGS

FIG. 2 shows a schematic cross section through a finger-like section of the hall of FIG. 1.

DETAILED DESCRIPTION

Figure 1:
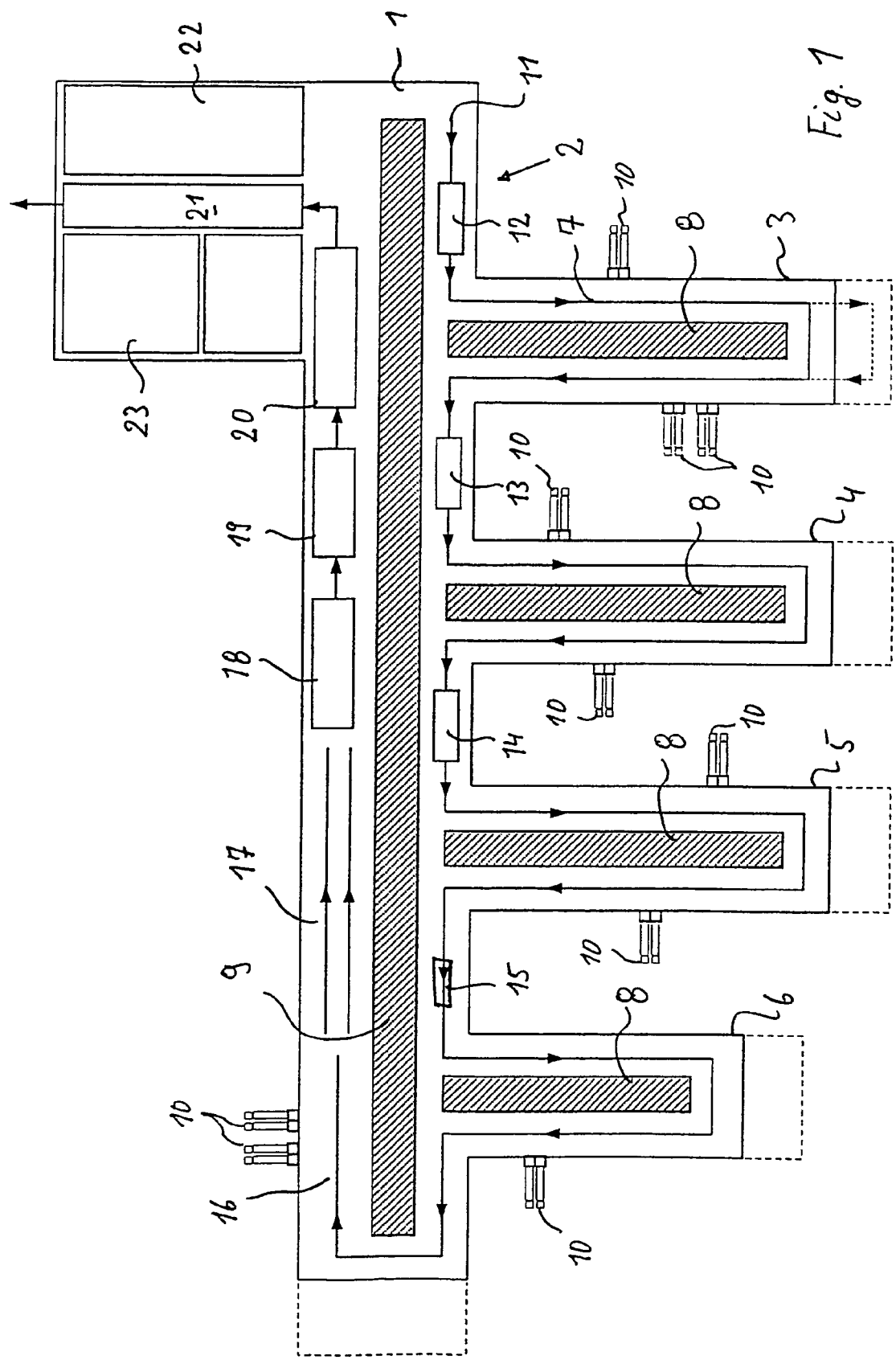
FIG. 1 shows a schematic top view of an assembly hall in accordance with an embodiment of the present invention.

FIG. 1 shows a schematic diagram of a central assembly hall 1 for the final assembly of motor vehicles, in particular passenger vehicles. In this example, four finger-like hall extensions 3, 4, 5 and 6 are added onto a long side 2 of this assembly hall 1.

The conveyor system 7 runs in a U shape on the outer sides of the assembly hall 1 and the hall extensions 3 through 6. This shows the conveyor system 7 as a single conveyor installation. In practice, however, it consists of multiple conveyor installations, which may be expanded as needed.

The return conveyance of the individual conveyor components 31 such as transport carriages, assembly equipment carriers and the like is accomplished in a second level II (FIG. 2) above the conveyor system. The components to be assembled at the assembly sites are supplied via a separate conveyor system which is situated in its own third level III (FIG. 2) above the second level. This prevents a mutual blockade of the individual conveyor systems. Renovation measures can thus be implemented largely independently of one another, within a short period of time and with a low investment cost.

Offices, social rooms, recreation rooms and also workshops are arranged between the legs of the U-shaped conveyor system 7. These areas are labeled in general as 8 in the hall extensions and 9 in the central assembly hall 1.

The supply of power, fresh air and other possible media and utilities to the conveyor system 7 as well as to the areas 8 and 9 takes place in a level above these areas (level IV in FIG. 2) through supply lines 30. This keeps them from interfering with the assembly itself and also eliminates interference in extending the halls.

Loading ramps 10 are provided on the hall extensions and on the central assembly hall at the locations required on the outside to allow rapid delivery of materials, e.g., by truck.

The design is explained again below on the basis of an assembly run. The vehicle bodies to be completed are supplied from the vehicle body storage (not shown) at 11 by means of a chain conveyor. The completely enameled vehicle bodies are stored temporarily in the vehicle body storage until retrieved for final assembly.

The enameled body thus supplied is lowered by a hoisting station onto the floor level of the central assembly hall 1 and transported by another chain conveyor as part of the conveyor system 7 in a cyclic operation.

The frame number is worked into the body by a robot at a first fixed point 12. Then in this area the doors of the vehicle are dismantled and transferred to a suspension gear by a handling device. To prevent damage during assembly and to improve accessibility, the doors are preassembled at a separate preassembly location which is set up in a supply center in another building (not shown in detail here). Transport of the doors into the supply center is accomplished via an electric overhead monorail conveyor in the third level.

The suspension gear is raised to the conveyor level in hoisting stations. Following the removal of the doors, the cover of the sunroof is installed—if one is provided for the vehicle. To do so, the so-called sunroof cassette is installed with the help of a robot. The vehicle then leaves the first fixed point 12.

Next the vehicle bodies are lifted up from the carrying chain conveyor by an electric monorail overhead conveyor and then set down on a pusher plate. This pusher plate technique (plate set into the floor, so that the vehicle stands on the plate which is broad enough to allow a worker to be conveyed along together with the vehicle) is used all the way to the end of the vehicle assembly line with a brief interruption. The pusher plate forms are equipped with lifting tables, so that the vehicle can always be raised to an ergonomically advantageous level.

With this pusher plate the vehicle is conveyed into the first section 3 of the hall where mainly manual work is performed such as installation of control units and cable trees.

Then the vehicle again goes back to the central assembly hall 1 to the second fixed point 13 where the cockpit is installed with the help of a robot.

The cockpit is preassembled at the supply center and tested, conveyed to the assembly station and lowered there with the help of a hoisting station to the floor level.

Then the vehicle leaves the second fixed point 13 in the central assembly hall and enters the hall section 4, where the vehicle passes through so-called swivel assembly, a suspension conveyor system, where the vehicle body can be rotated about its longitudinal axis. This swiveling of the vehicle body permits an ergonomically favorable installation of parts on the underbody of the vehicle (tank, lines, screening plates; etc.).

Then the vehicle bodies are transferred back to the pusher-type technique.

After the installation of additional paneling sections in the interior, the vehicles then leave the hall section 4 again and go to the third fixed point 14 in the central assembly hall 1, where the windows, windshield and seats are installed.

The vehicle next leaves the central assembly hall 1 again and goes to the hall section 5, where the remaining equipment parts are installed in the interior and in the luggage space, on the underbody and in the engine space of the vehicle.

The vehicle then leaves the hall section 5 and again goes into the central assembly hall 1 to the fourth fixed point 15, where the conveyor technology is automatically changed. The vehicle is then transferred to a monorail conveyor, which holds the vehicle on suitable adapters on the vehicle underbody. The suspended conveyor also has a height adjustment so that here again good ergonomics can be ensured for the workers. Furthermore, the painting crossbar which previously served as a conveyor component and by which the vehicle was previously connected to the previous conveyor device, is dismantled here.

Then the vehicle goes back out of the central assembly hall into the hall section 6, where the accessories are installed.

After leaving the hall section 6, the vehicles go back to the central assembly hall 1, then switch to the other longitudinal side of the building. The so-called front end (front bumper, lights, etc.), rear bumper and wheels are installed here. The vehicle is now ready to roll.

At the next station, the vehicles enter the filling station, where they are filled with the required operating fluids.

After passing through the filling zone 17, the vehicle is then started for the first time. If no problem occurs, the vehicle can be moved on its own power starting at this point in time. At the end of the filling conveyor belts, there is for the first time the possibility of removing the finished vehicles from the manufacturing flow and eliminating major errors at reworking sites specifically set up for this purpose.

Next there is a first finishing (station 18), where minor reworking is performed in addition to electric and electronic peripherals. Adjustments in the doors and valves are also done here.

After conclusion of the first finishing, the vehicles go to a testing zone 19, where a number of testing stations have been set up. In this area, the vehicles move under their own engine power.

Following the testing zone 19, another finishing zone 20 is provided, where the clean-up work and a surface test are performed.

Vehicles that do not require any further refinishing leave the finishing zone 20 and are prepared for shipping in a shipping zone 21.

Vehicles found to have painting defects in the second finishing zone 20 go into a neighboring lacquer region 22, where they are refinished. When they are ready for shipping, they are supplied to the shipping zone 21.

To be able to subject mass-produced vehicles to an overall vehicle analysis, an analysis center 23 where the vehicles can be subjected to testing in particular is also integrated into the system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Assembly plant for assembling vehicles, having a central assembly hall, having at least one conveyor system for transporting the products to be assembled from one assembly site to another, whereby at least one partial segment of the conveyor system is arranged in a U shape, wherein the central assembly hall is constructed primarily as an elongated building and on at least one of its longitudinal sides, multiple finger-like hall partial regions projecting away from the central assembly hall are provided, the conveyor system being arranged in each of the finger-like hall partial regions, wherein only essentially automated assembly sites are provided in the central assembly hall along a longitudinal partial segment of the conveyer system that runs between the finger-like partial regions, and wherein manual assembly sites are provided in the finger-like partial regions.

2. Assembly plant as claimed in claim 1, wherein the multiple finger-like hall partial regions are arranged parallel to one another.

3. Assembly plant as claimed in claim 1, wherein social rooms and/or work rooms are provided between legs of U-shaped conveyor devices.

4. Assembly plant as claimed in claim 1, wherein supply lines for nearby assembly areas are arranged above social rooms and/or work rooms.

5. Assembly plant as claimed in claim 1, wherein at least one additional level having conveyor installations is provided above at least one of the at least one conveyor system.

6. Assembly plant as claimed in claim 1, wherein each product is connected by conveyor components to one of a plurality of conveyor devices, and the conveyor devices with the products to be monitored are provided in a first level and the conveyor devices for return conveyance of the conveyor components is provided in a second level above the first level.

7. Assembly plant as claimed in claim 5, wherein another conveyor device for supplying the components or component groups that are to be assembled is provided in a third level which is above the second level.

* * * * *